(12) United States Patent
Panchal et al.

(10) Patent No.: US 10,893,448 B2
(45) Date of Patent: Jan. 12, 2021

(54) METHOD AND SYSTEM FOR ANCHOR CELL RESELECTION WITH MULTI-RAT DUAL-CONNECTIVITY

(71) Applicant: Verizon Patent and Licensing Inc., Arlington, VA (US)

(72) Inventors: Jignesh S. Panchal, Hillsborough, NJ (US); Yuexin Dong, Bridgewater, NJ (US); Andrew E. Youtz, Princeton, NJ (US); Lily Zhu, Parsippany, NJ (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 161 days.

(21) Appl. No.: 15/995,646

(22) Filed: Jun. 1, 2018

(65) Prior Publication Data

US 2019/0373523 A1 Dec. 5, 2019

(51) Int. Cl.
| | |
|---|---|
| *H04W 76/15* | (2018.01) |
| *H04W 36/08* | (2009.01) |
| *H04W 76/27* | (2018.01) |
| *H04W 48/20* | (2009.01) |
| *H04W 76/30* | (2018.01) |

(52) U.S. Cl.
CPC .......... *H04W 36/08* (2013.01); *H04W 48/20* (2013.01); *H04W 76/15* (2018.02); *H04W 76/27* (2018.02); *H04W 76/30* (2018.02)

(58) Field of Classification Search
CPC ..... H04W 36/08; H04W 76/15; H04W 76/27; H04W 76/30; H04W 48/20; H04W 48/18
See application file for complete search history.

(56) References Cited

U.S. PATENT DOCUMENTS

| | | | | |
|---|---|---|---|---|
| 8,774,131 | B1 * | 7/2014 | Singh | H04W 48/18 370/331 |
| 10,139,834 | B2 * | 11/2018 | Bai | H04W 4/046 |
| 2008/0003941 | A1 * | 1/2008 | Milstein | H04L 67/30 455/3.01 |
| 2008/0101339 | A1 * | 5/2008 | Forbes | H04L 12/66 370/352 |

(Continued)

*Primary Examiner* — Un C Cho
*Assistant Examiner* — Kenan Cehic

(57) ABSTRACT

A wireless station of a radio access network receives a reselection priority value of a frequency band used when the wireless station is an E-UTRA-NR Dual Connectivity (EN-DC) anchor. The wireless station broadcasts an intra-frequency system information block (SIB) that includes a first Cell Reselection Priority information element (IE) and a first Anchor-cell Reselection Priority IE, wherein the first Anchor-cell Reselection Priority IE includes the reselection priority value of the frequency band used by the wireless station. The wireless station also broadcast an inter-frequency SIB that includes a second Cell Reselection Priority IE and a second Anchor-cell Reselection Priority IE, wherein the second Anchor-cell Reselection Priority IE includes another reselection priority value of another frequency band for another EN-DC anchor. Use of additional anchor-cell priorities enable EN-DC-capable end devices to camp on an anchor cell even when a non-anchor cell has a higher conventional priority than the anchor cell.

20 Claims, 12 Drawing Sheets

(56) References Cited

U.S. PATENT DOCUMENTS

| | | | |
|---|---|---|---|
| 2010/0222060 A1* | 9/2010 | Zhang | H04W 36/30 |
| | | | 455/436 |
| 2011/0170481 A1* | 7/2011 | Gomes | H04W 36/00835 |
| | | | 370/328 |
| 2012/0276945 A1* | 11/2012 | Chindapol | H04W 48/20 |
| | | | 455/525 |
| 2013/0308648 A1* | 11/2013 | Shamis | H04L 47/31 |
| | | | 370/395.53 |
| 2014/0128082 A1* | 5/2014 | Chirayil | H04W 36/38 |
| | | | 455/438 |
| 2015/0067172 A1* | 3/2015 | Ashokan | H04L 67/101 |
| | | | 709/226 |
| 2015/0172977 A1* | 6/2015 | Koc | H04W 36/0083 |
| | | | 455/437 |
| 2016/0007260 A1* | 1/2016 | Abraham | H04W 36/00837 |
| | | | 370/331 |
| 2017/0353904 A1* | 12/2017 | Kim | H04W 48/16 |
| 2018/0084467 A1* | 3/2018 | Henttonen | H04W 36/0083 |
| 2018/0241416 A1* | 8/2018 | Axmon | H03M 13/093 |
| 2018/0352488 A1* | 12/2018 | Selvaganapathy | H04W 48/16 |
| 2018/0368099 A1* | 12/2018 | Chen | H04W 48/18 |
| 2019/0215800 A1* | 7/2019 | Fujishiro | H04W 8/08 |
| 2019/0289531 A1* | 9/2019 | Takahashi | H04W 48/12 |
| 2019/0297510 A1* | 9/2019 | Maeda | H04W 48/12 |

* cited by examiner

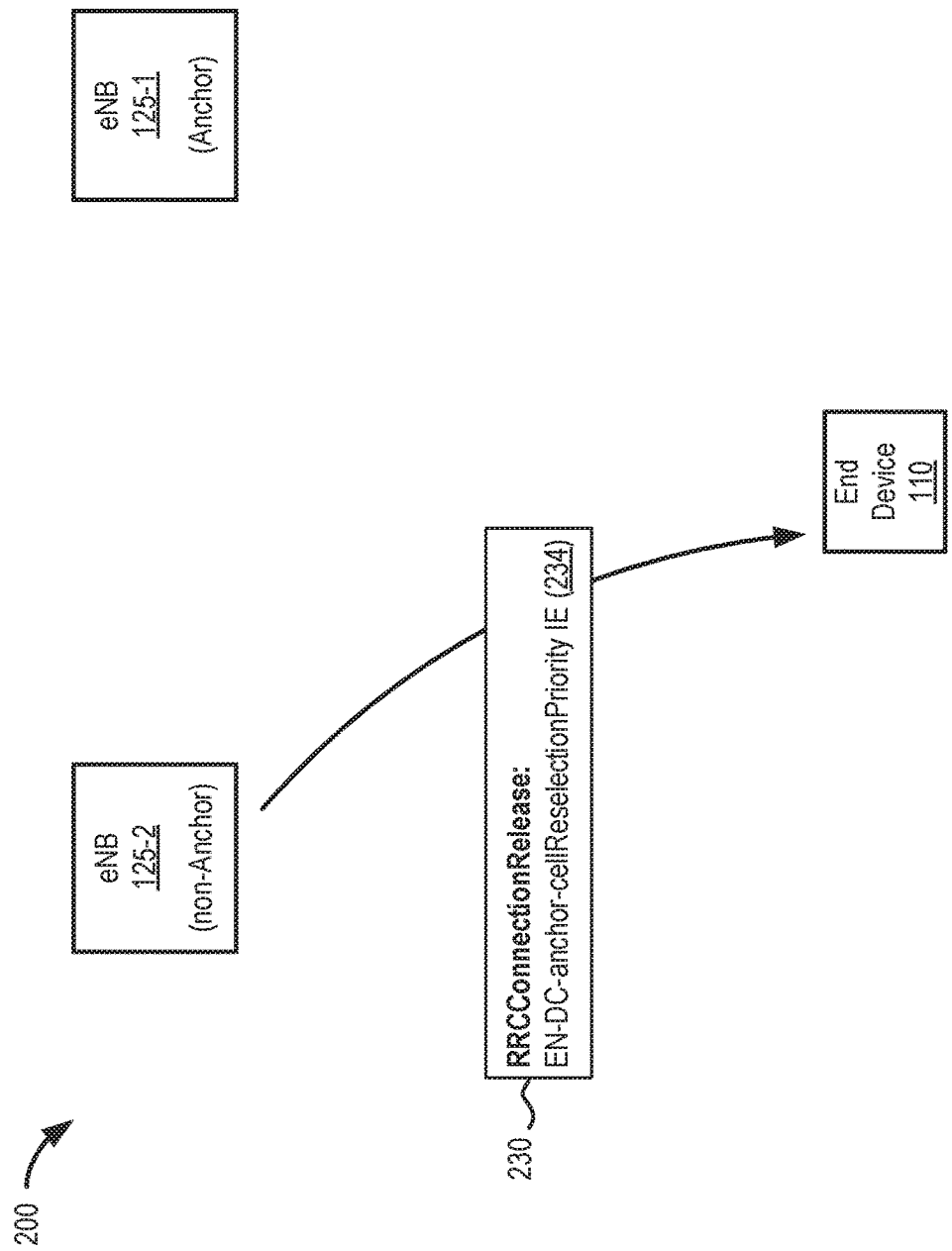

| LTE B66 (Anchor Cell) | Band/ Freq. | Cell Reselection Priority | Cell Reselection SubPriority | Effective Priority | EN-DC-Anchor Cell Reselection Priority | EN-DC-Anchor Cell Reselection SubPriority | EN-DC-Anchor Effective Priority |
|---|---|---|---|---|---|---|---|
| SIB3 (Intra-Freq.) | B66/F1.1 | 2 | - | 2 | 1 | - | 1 |
| SIB5 (Inter-Freq.) | B66/F1.2 | 2 | 0.4 | 2.4 | 1 | 0.4 | 1.4 |
|  | B5/F3 | 4 | - | 4 | - | - | - |
|  | B2/F4 | 3 | - | 3 | - | - | - |
|  | B13/F5 | 1 | - | 1 | 2 | - | 2 |
| RCC Connection Release | B5/F3 | 4 | - | 4 | - | - | - |
|  | B2/F4 | 3 | - | 3 | - | - | - |
|  | B66/F1.1 | 2 | - | 2 | 1 | - | 1 |
|  | B66/F1.2 | 2 | 0.4 | 2.4 | 1 | 0.4 | 1.4 |
|  | B13/F5 | 1 | - | 1 | 2 | - | 2 |

FIG. 4B

| LTE B5 (non-Anchor Cell) | Band/ Freq. | Cell Reselection Priority | Cell Reselection SubPriority | Effective Priority | EN-DC-Anchor Cell Reselection Priority | EN-DC-Anchor Cell Reselection SubPriority | EN-DC-Anchor Effective Priority |
|---|---|---|---|---|---|---|---|
| SIB3 (Intra-Freq.) | B5/F3 | 4 | - | 4 | - | - | - |
| SIB5 (Inter-Freq.) | B2/F4 | 3 | - | 3 | - | - | - |
|  | B66/F1.1 | 2 | - | 2 | 1 | - | 1 |
|  | B66/F1.2 | 2 | 0.4 | 2.4 | 1 | 0.4 | 1.4 |
|  | B13/F5 | 1 | - | 1 | 2 | - | 2 |
| RRC Connection Release | B5/F3 | 4 | - | 4 | - | - | - |
|  | B2/F4 | 3 | - | 3 | - | - | - |
|  | B66/F1.1 | 2 | - | 2 | 1 | - | 1 |
|  | B66/F1.2 | 2 | 0.4 | 2.4 | 1 | 0.4 | 1.4 |
|  | B13/F5 | 1 | - | 1 | 2 | - | 2 |

FIG. 4C

```
EN-DC-Anchor-InterFreqCarrierFreqInfo-vXXXX ::= SEQUENCE {
    EN-DC-Anchor-cellReselectionPriority-rXX       CellReselectionPriority       OPTIONAL, -- Need OP
    EN-DC-Anchor-cellReselectionSubPriority-rXX    CellReselectionSubPriority-r13 OPTIONAL -- Need OP
}
```

FIG. 6

```
EN-DC-Anchor-FreqPriorityEUTRA-rXX ::=    SEQUENCE {
    carrierFreq-rXX                           ARFCN-ValueEUTRA-r9
    EN-DC-Anchor-cellReselectionPriority-rXX  CellReselectionPriority       OPTIONAL, -- Need OP
    EN-DC-Anchor-cellReselectionSubPriority-rXX  CellReselectionSubPriority-r13  OPTIONAL -- Need OP
}
```

METHOD AND SYSTEM FOR ANCHOR CELL RESELECTION WITH MULTI-RAT DUAL-CONNECTIVITY

BACKGROUND

The development and design of future generation wireless networks (e.g., Fifth Generation (5G) networks) is currently underway by various organizations, service providers, and so forth. For example, the development and design of a network may be based on cloud technologies, software defined networking (SDN), and network function virtualization (NFV).

Dual connectivity solutions may be employed when user equipment (UE) can connect to different Radio Access Technology (RAT) types simultaneously.

BRIEF DESCRIPTION OF THE DRAWINGS

FIGS. 2A and 2B are diagrams illustrating exemplary anchor cell reselection signaling in a portion of the network environment of FIG. 1;

FIG. 4B is a table illustrating exemplary cell reselection priorities for an anchor eNB in the portion of network environment of FIG. 4A according to an implementation;

FIG. 4C is a table illustrating exemplary cell reselection priorities for a non-anchor eNB in the portion of network environment of FIG. 4A according to an implementation;

FIG. 6 is an exemplary format of a System Information Block 5 (SIB5) IE for anchor cell reselection priority, according to an implementation;

FIG. 7 is an exemplary format of a Radio Resource Control (RRC) Connection Release IE for anchor cell reselection priority, according to an implementation.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Dual connectivity solutions are employed when end devices (e.g., user equipment) can connect to different RAT types simultaneously. For example, with development of future generation radio technologies, such as Fifth Generation New Radio (5G NR), an end device will be able to connect simultaneously to a 5G NR radio access network (RAN) and an Evolved Universal Mobile Telecommunications System (UMTS) Terrestrial Radio Access Network (E-UTRAN) of a Long Term Evolution (LTE) network. In such cases, downlink and uplink packets can be transmitted over either/both of the radio access technologies. Thus, end devices can connect simultaneously to 5G NR and E-UTRAN for different bearers (e.g., different logical channels with particular end-to-end quality of service (QoS) requirements) or even split bearers.

A wireless station (e.g., an LTE evolved NodeB (eNB)) may serve as an anchor for E-UTRA+ 5G NR Dual Connectivity. Current networking standards define cell reselection priorities (e.g., cellReselectionPriority and cellReselectionSubPriority) for LTE cells generally. However, different priorities are not defined for an LTE cell anchoring LTE and 5G NR Dual Connectivity (EN-DC). This lack of priority distinction between conventional LTE eNBs and anchor LTE eNBs makes it difficult for EN-DC-capable devices to camp on an LTE anchor cell when an LTE anchor cell is at a lower priority than another LTE cell which is not an anchor. This is especially a problem for co-located LTE cells that support different bands/carriers.

In systems and methods described herein a wireless station of a RAN receives a reselection priority value of a frequency band used when the wireless station is an E-UTRA-NR Dual Connectivity (EN-DC) anchor. The wireless station broadcasts an intra-frequency system information block (SIB) that includes a first Cell Reselection Priority information element (IE) and a first Anchor-cell Reselection Priority IE, wherein the first Anchor-cell Reselection Priority IE includes the reselection priority value of the frequency band used by the wireless station. The wireless station also broadcast an inter-frequency SIB that includes a second Cell Reselection Priority IE and a second Anchor-cell Reselection Priority IE, wherein the second Anchor-cell Reselection Priority IE includes another reselection priority value of another frequency band for another EN-DC anchor. Use of additional anchor-cell priorities enable EN-DC-capable end devices to more consistently camp on an anchor cell even when a non-anchor cell has a higher conventional priority than the anchor cell.

Figure 1:
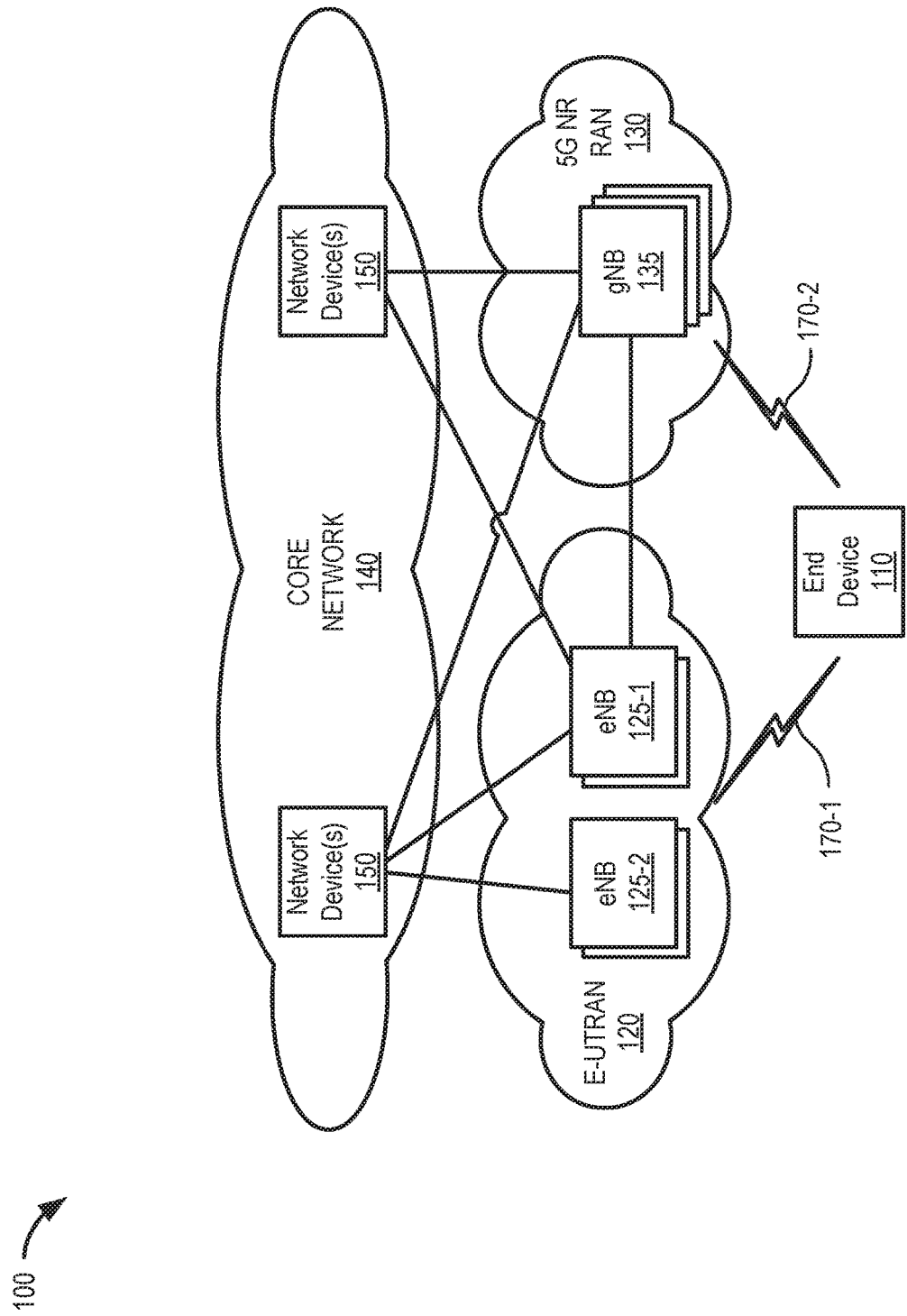
FIG. 1 is a diagram illustrating an exemplary multi-RAT dual connectivity network environment in which anchor cell reselection may be implemented.

FIG. 1 is a diagram of an exemplary network environment 100 in which the systems and methods, described herein, may be implemented. As shown in FIG. 1, environment 100 may include an end device 110, an E-UTRAN including multiple eNodeBs (eNB) 125-1 and 125-2 (referred to collectively as eNBs 125 and generically as eNB 125), a 5G NR RAN 130 including multiple gNBs 135, and a core network 140 with network devices 150. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

In the configuration of FIG. 1, end device 110 (e.g., a UE) may use wireless channels 170-1 and 170-2 (referred to collectively as wireless channels 170) to access E-UTRAN 120 and 5G NR RAN 130, respectively. Wireless channels 170 may correspond, for example, to physical layer protocols in accordance with different RAT types. For example, wireless channel 170-1 may correspond to physical layer protocols for 4G RAN standards (e.g., 3GPP standards for 4G air interfaces, etc.), while wireless channel 170-2 may correspond to physical layer protocols for 5G New Radio standards (e.g., 3GPP standards for 5G air interfaces, etc.). Wireless channels 170 may be used to provide communications to/from end device 110 using dual-connectivity with different bearers.

In some implementations, end device 110 may include any type of mobile device having multiple coverage mode capabilities, and thus the capability to communicate simultaneously with different wireless stations (e.g., eNB 125, gNB 135, etc.) using different wireless channels (e.g., channels 170) corresponding to the different RANs (e.g., E-UTRAN 120 and 5G NR RAN 130). Thus, end device 110 may be referred to herein as an EN-DC-capable end device when distinguishing from an end device that is not EN-DC-capable. End device 110 may be a mobile device that may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or a digital camera that includes communication capabilities (e.g., wireless communication mechanisms such as Wi-Fi). In other implementation, end device 110 may be implemented as a machine-type communications (MTC) device, an Internet of Things (IoT) device, a machine-to-machine (M2M) device, etc.

eNB 125 may include a network device that has computational and wireless communicative capabilities. In some instances, eNB 125 may be referred to as a "wireless station." eNB 125 may include a transceiver system and other components having functionality that allow end device 110 to wirelessly connect to E-UTRAN 120 and core network 140. eNB 125 may interface with core network 140 via a Diameter S1 interface, for example.

gNB 135 may include a network device and other components having functionality that allow end device 110 to wirelessly connect to 5G NR RAN 130 and core network 140. In one implementation, gNB 135 may interface with core network 140 via a Diameter S1 interface.

In the context of a multi-RAT dual connectivity environment, eNBs 125-1 and 125-2 may be configured with different capabilities. For example, eNBs 125-1 includes logic that enables eNBs 125-1 to serve as a dual-connectivity anchor to deliver packets between core network 140 and end device 110 via either wireless channel 170-1 or via wireless channel 170-2 (e.g., using gNB 135). eNB 125-2 and gNB 135 may communicate with each other via an X2 interface. An X2 interface may be implemented, for example, with a protocol stack that includes an X2 application protocol and Stream Control Transmission Protocol (SCTP). The X2 interface may be divided into a control plane interface, X2-C, and a user plane interface, X2-U. Conversely, eNB 125-2 may not include anchor capabilities.

Core network 140 may include one or multiple networks of one or multiple types. For example, core network 140 may be implemented to include a terrestrial network and/or a satellite network. According to an exemplary implementation, core network 140 includes a complementary network pertaining to multiple RANs. For example, core network 140 may include the core part of an LTE network, an LTE-A network, a 5G network, a legacy network, and so forth. Depending on the implementation, core network 140 may include various network elements that may be implemented in network devices 150. Such network elements may include a mobility management entity (MME), a user plane function (UPF), a session management function (SMF), a core access and mobility management function (AMF), a unified data management (UDM), a packet data network gateway (PGW), a serving gateway (SGW), a policy control function (PCF), a home subscriber server (HSS), as well as other network elements pertaining to various network-related functions, such as billing, security, authentication and authorization, network polices, subscriber profiles, network slicing, and/or other network elements that facilitate the operation of core network 140.

Radio resource control RRC may be considered a protocol that handles signaling between end device 110 and a radio access network (e.g., E-UTRAN 120 and/or 5G NR RAN 130). RRC states (e.g., idle, connected, etc.) may be handled by the control plane which includes an RRC layer. During RRC idle mode, end device 110 may camp on a cell after cell selection or reselection takes place, where factors such as, for example, radio link quality, cell status, and radio access technology may be considered. As used herein "camping" on a selected cell refers to end device 110 maintaining data exchanges with core network 140 within the confines of the selected cell (e.g., associated with one of eNBs 125). A "cell" may include a coverage area served by an eNB (e.g., one of eNBs 125) using a particular frequency band. Thus, in some cases, a cell and the eNB 125 servicing the cell may be referred to interchangeably. End device 110 may also monitor a paging channel to detect incoming calls and acquire system information. In the idle mode, the control plane protocols include cell selection and reselection procedures. During RRC connected mode, end device 110 may provide E-UTRAN 120 with downlink channel quality and neighbor cell information so E-UTRAN 120 may assist end device 110 to select the most suitable cell. Particularly, end device 110 may measure parameters associated with a current cell to which end device 110 is attached, as well as the neighboring cells, to make a decision to camp on the cell providing the strongest signal. The key parameters of the cell, (e.g., found in the master information block (MIB) and the system information blocks (SIBs)), may be measured for the intra-frequency and inter-frequency neighboring cells. The measurements may be tracked and uploaded to the RRC layer, which makes control decisions on which cell end device 110 is to camp. Accordingly, cell selection/reselection may be based on a number of levels of criteria, which may include absolute priority, radio link quality, and/or cell accessibility.

In a multi-RAT dual connectivity environment, without priority distinctions between LTE anchor cells (e.g., served by eNB 125-1) and LTE non-anchor cells (served by eNB 125-2), end device 110 (e.g., when EN-DC capable) may have difficulty camping on an anchor cell. For example, assume an advanced wireless system (AWS) band (e.g., B66) is the anchor band but associated reselection priority of a B66 LTE cell is lower than PCS band (B2) and Cellular band (B5) cells. Given the LTE cell reselection priority, end device 110 will camp on the highest priority B2/B5 cells and not camp on the B66 anchor cell. Hence, end device 110 would not be able to establish a dual connection with gNB 135 and would not be able to take advantage of an available high-speed 5G connection.

In the example described above, simply changing the reselection priority of the B66 anchor cell to the highest priority so as to direct end device 110 to camp on the anchor cell would cause undesirable side effects. Namely, since SIBs are broadcast to all devices in a coverage area, changing the B66 anchor cell priority would cause LTE-only devices (e.g., end devices without EN-DC capability) to also be directed to camp on the B66 cells as opposed to higher priority B2 or B5 cells, resulting in degraded user experience for the LTE only devices. Thus, implementations described herein provide dedicated priorities and sub-priorities for LTE anchor cells while maintaining existing priority of all cells for standard LTE services.

Figure 2A:
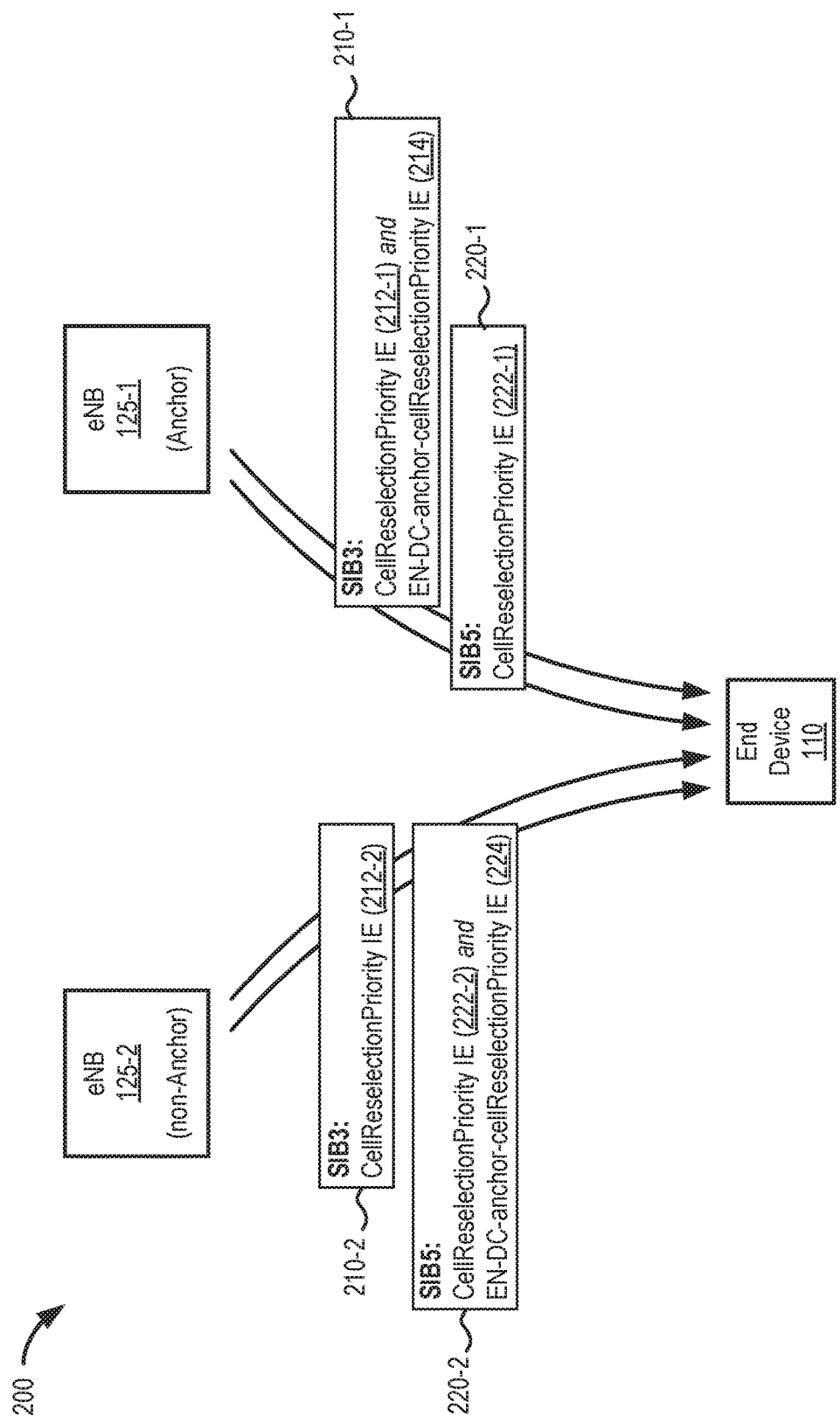

FIGS. 2A and 2B are diagrams illustrating exemplary anchor cell reselection signaling in a portion 200 of network environment 100. FIG. 2A illustrates exemplary broadcast signals provided by eNB 125-1 and 125-2 to provide priorities for cell selection by end device 110. In accordance with LTE current standards, each eNB 125 broadcasts its own (intra-frequency) cellReselectionPriority IE 212 (e.g., cellReselectionPriority IE 212-1 or cellReselectionPriority IE 212-2) to all devices in its coverage area over SIB3 210. Also, each eNB 125 broadcasts its inter-frequency neighbors' cellReselectionPriority IE 222 (e.g., cellReselectionPriority IE 222-1 or 222-2) to all devices in its coverage area over SIB5 220. Additionally, as shown in FIG. 2A, an EN-DC-anchor-cellReselectionPriority IE in SIB3 210 and SIB5 220 is defined for an LTE anchor cell.

If an eNB 125 is a dual-connectivity anchor, it broadcasts its own (intra-frequency) EN-DC-anchor-cellReselectionPriority 214 to all devices in its coverage area over SIB3. Otherwise, if an eNB 125 is not a dual-connectivity anchor, the eNB does not broadcast the EN-DC-anchor-cellReselectionPriority 214. Thus, in the example of FIG. 2A, eNB 125-1, which serves as a dual-connectivity anchor, may broadcast SIB3 210-1, which includes cellReselectionPriority IE 212-1 and EN-DC-anchor-cellReselectionPriority 214. Conversely, eNB 125-2, which is not an anchor, may broadcast SIB3 210-2 including cellReselectionPriority IE 212-2.

If an eNB 125, serving as either an anchor or non-anchor, has an LTE anchor cell as its neighbor, eNB 125 may broadcast its inter-frequency neighbor's EN-DC-anchor-cellReselectionPriority to all devices in its coverage area over SIB5. Since (in the example of FIG. 2A) no other anchors are adjacent to eNB 125-1, eNB 125-1 may broadcast SIB5 250-1, which includes cellReselectionPriority IE 222-1. Conversely, since an anchor (e.g., eNB 125-1) is adjacent to eNB 125-2, eNB 125-2 may broadcast SIB3 220-2 including cellReselectionPriority IE 222-2 and EN-DC-anchor-cellReselectionPriority 224.

In some implementations, SIB3s 210 and SIB5s 220 may also include an EN-DC-anchor-cellReselectionSubPriority (not shown in FIG. 2A). As described further herein, end device 110 may receive SIB3s 210 and SIB5s 220 from eNBs 125 and apply the indicated cell priorities or sub-priorities. Assuming end device 110 is EN-DC capable, end device 110 would decode the EN-DC-anchor-cellReselectionPriority and EN-DC-anchor-cellReselectionSubPriority IEs of SIB3s 210 and SIB5s 220. If end device 110 is not EN-DC capable or is an LTE-only legacy device, end device 110 will not use the EN-DC-anchor-cellReselectionPriority and EN-DC-anchor-cellReselectionSubPriority IEs of SIB3s 210 and SIB5s 220, but will decode only the legacy cellReselectionPriority plus cellReselectionSubPriority and perform cell reselection as per current standards.

Referring to FIG. 2B, each eNB 125 may also be configured to provide an EN-DC-anchor-cellReselectionPriority IE 234 and an EN-DC-anchor-cellReselectionSubPriority IE (not shown in FIG. 2B) in an RRCConnectionRelease message 230 to end device 110. RRCConnectionRelease message 230 with EN-DC-anchor-cellReselectionPriority IE 234 may be provided, for example, only if the end device 110 is EN-DC capable, and E-UTRAN 120 wants to change the anchor priority for end device 110 to redirect to an anchor on another frequency (e.g., another eNB 125-1). E-UTRAN 120 may use this "release and redirect" to an LTE anchor cell, post-handover when an EN-DC capable end device 110 is handed over from a non-EN-DC coverage area to an EN-DC coverage area but on a non-anchor cell.

Although FIGS. 2A and 2B illustrate an exemplary communications for anchor cell reselection in a multi-RAT dual connectivity environment, according to other exemplary embodiments, additional, different, and/or fewer communication may be used.

Figure 3:
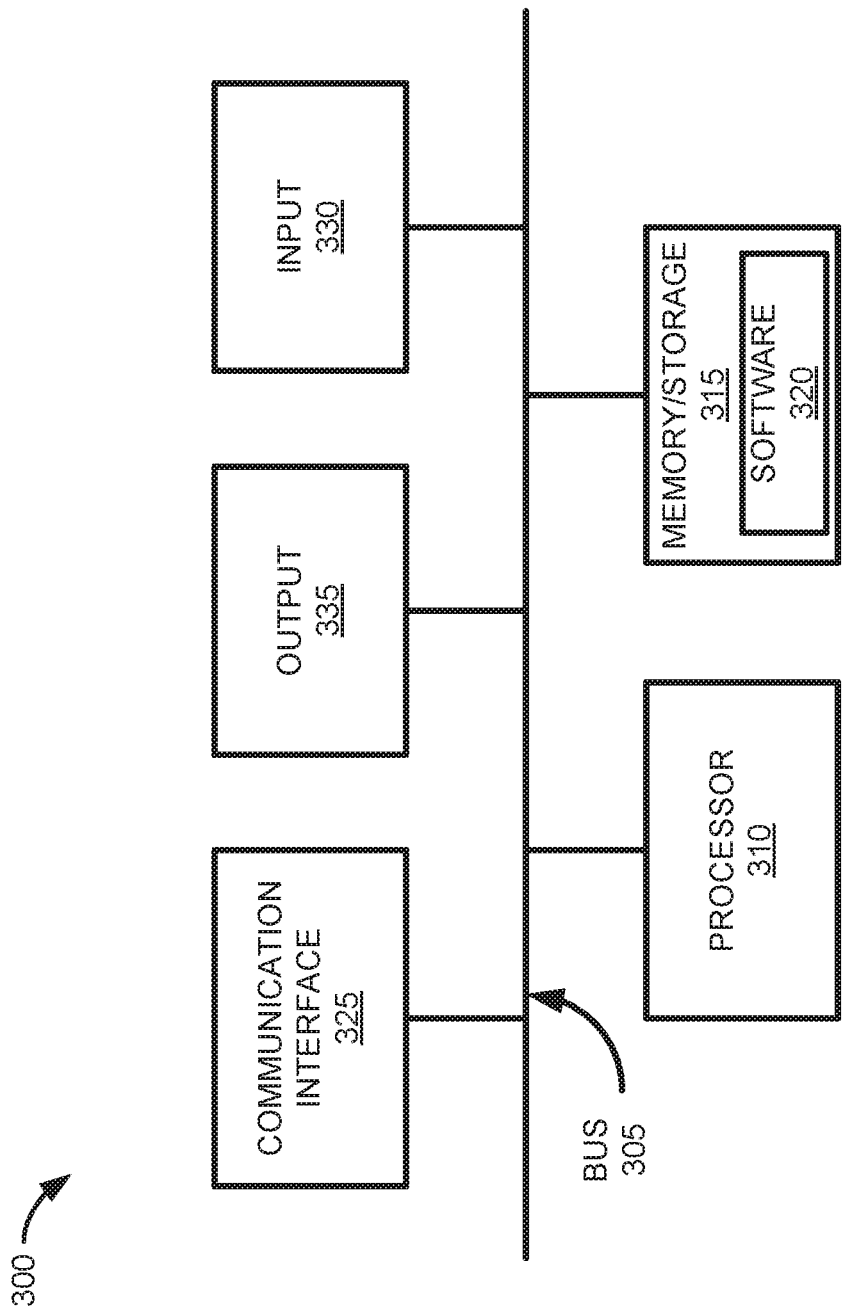
FIG. 3 is a diagram illustrating exemplary components of a device that may correspond to one or more of the devices illustrated and described herein.

FIG. 3 is a diagram illustrating exemplary components of a device 300 that may correspond to one or more of the devices described herein. For example, device 300 may correspond to components included in end device 110, eNB 125, gNB 130, or network device 150. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, end device 110 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4A:
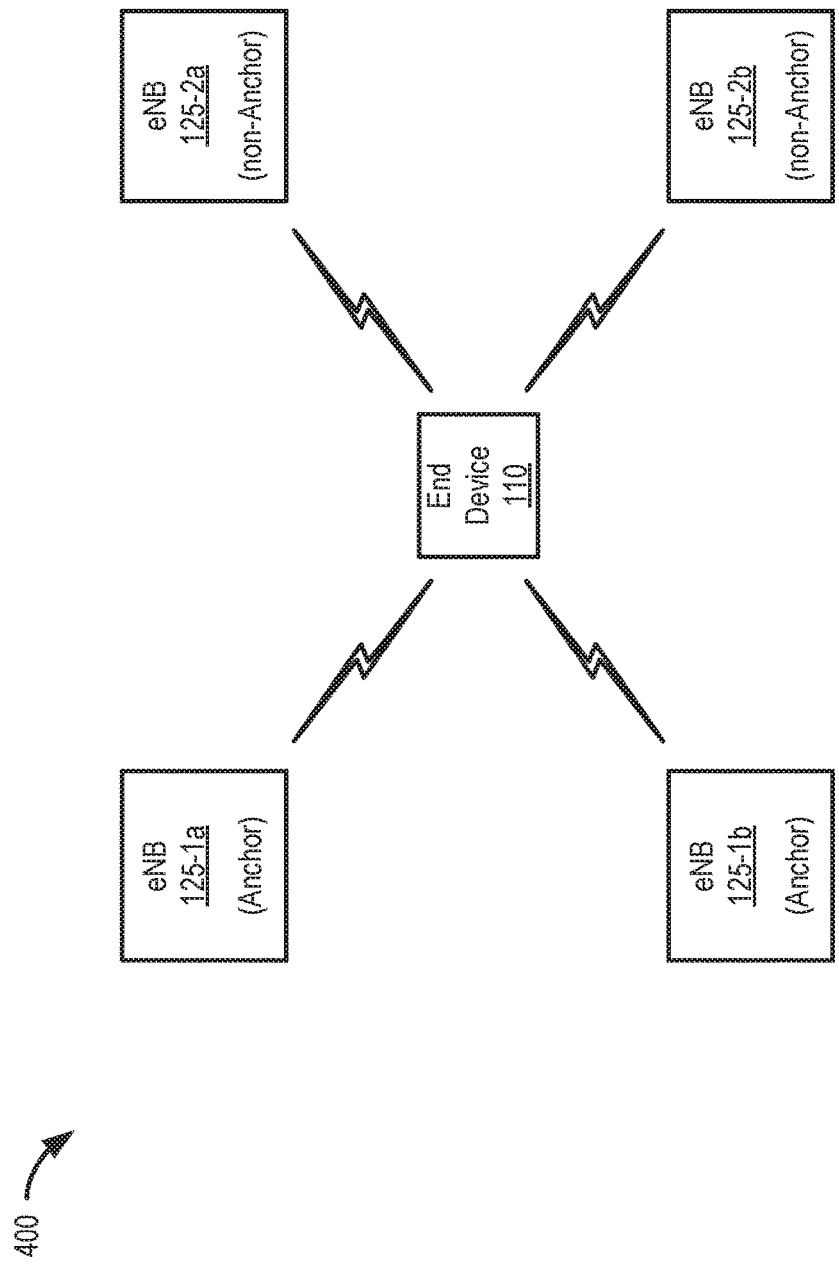
FIG. 4A is a diagram illustrating an environment for anchor cell reselection signaling in another portion of the network environment of FIG. 1.

FIG. 4A is a diagram illustrating anchor cell reselection signaling in another portion 400 of network environment 100. As shown in FIG. 4A, network portion 400 may include end device 110 in wireless signal range of two anchor cells, eNB 125-1a and eNB 125-1b, and two non-anchor cells, eNB 125-2a and eNB 125-2b. Network portion 400 may represent an EN-DC deployment, where the anchor bands are the upper 700 MHz band (B13) supported by eNB 125-1a and AWS band (B66) supported by eNB 125-1b. Non-anchor bands in the example of FIG. 4A are PCS band (B2) supported eNB 125-2a and Cellular band (B5) supported by eNB 125-2b.

As shown in FIGS. 4B and 4C, eNBs 125 of FIG. 4A may implement EN-DC-anchor-cellReselectionPriority and EN-DC-anchor-cellReselectionSubPriority IEs to enable EN-DC devices (e.g., end device 110) to camp on a LTE anchor cell when an LTE anchor cell is at lower priority than another LTE cell which is not an anchor. FIGS. 4B and 4C are tables showing exemplary cell reselection priorities for two of the cells of FIG. 4A. Particularly, FIG. 4B includes a table 410 showing exemplary cell reselection priorities and sub-priorities for AWS band (B66) supported by anchor eNB 125-1b, and FIG. 4C includes a table 420 showing exemplary cell reselection priorities and sub-priorities for Cellular band (B5) supported by non-anchor eNB 125-2b. The values illustrated and described in relation to FIGS. 4B and 4C are exemplary, and the ranges of values, as described herein are exemplary.

Referring to FIG. 4B, table 410 includes a signal type field 411, a frequency ID field 412, a cellReselectionPriority field 413, a cellReselectionSubPriority field 414, an effective priority field 415, an EN-DC-anchor-cellReselectionPriority field 416, an EN-DC-anchor-cellReselectionSubPriority field 417, an EN-DC effective priority field 418, and a variety of entries 419 for fields 411-418.

Signal type field 411 indicates the type of communication signal associated with the corresponding entries in other fields 412-418, including priority selections of cellReselectionPriority field 413 and EN-DC-anchor-cellReselection-Priority field 416. Frequency ID field 412 indicates the cell frequency band (e.g., corresponding to one of eNBs 125) associated with the corresponding entries in other fields 413-418, including priority selections of cellReselectionPriority field 413 and EN-DC-anchor-cellReselectionPriority field 416. CellReselectionPriority field 413 may include an LTE reselection priority assigned by the network for each frequency band in frequency ID field 412. For example, priorities in cellReselectionPriority field 413 may include priorities for standard LTE-only connections with a value between 0-7, where 0 is the lowest priority and 7 is the highest priority. CellReselectionSubPriority field 414 may include an LTE reselection priority assigned by the network for frequencies within the same frequency band. For example, priorities in cellReselectionSubPriority field 414 may include sub-priorities for standard LTE-only connections with a value between 0.1 and 0.9, where 0.1 is the lowest sub-priority and 0.9 is the highest sub-priority. Effective priority field 415 may include a priority value based on a combination of values from corresponding entries in cellReselectionPriority field 413 and CellReselectionSubPriority field 414.

EN-DC-anchor-cellReselectionPriority field 416 may include an EN-DC anchor reselection priority assigned by the network for each applicable frequency band in frequency ID field 412. For example, priorities in EN-DC-anchor-cellReselectionPriority field 416 may include priority values for connections band B13 (corresponding to one of eNB 125-1a) and band B66 (corresponding to eNBs 12-1b). Similar to cellReselectionPriority field 413, an EN-DC-anchor-cellReselectionPriority value may be assigned between 0-7, where 0 is the lowest priority and 7 is the highest priority. EN-DC-anchor-CellReselectionSubPriority field 417 may include an anchor reselection priority assigned by the network for frequencies within the same frequency band. EN-DC-anchor effective priority field 417 may include a priority value based on a combination of values from corresponding entries in EN-DC-anchor-cellReselectionPriority field 416 and EN-DC-anchor-CellReselectionSubPriority field 417.

Referring to FIGS. 4A and 4B, eNB 125-1*b* may use priorities shown in table 410 to broadcast IEs in SIB3 and SIB5. Thus, eNB 125-1*b* may broadcast cellReselectionPriority values for SIB3 and SIB5 according to conventional LTE protocols. As an EN-DC anchor cell, eNB 125-1*b* may also broadcast its own (intra-frequency) EN-DC-anchor-cellReselectionPriority (e.g., "2") from field 413 to all devices in its coverage area over SIB3. For SIB5, eNB 125-1*b* may broadcast its inter-frequency neighbors' EN-DC-anchor-cellReselectionPriority from field 416 (e.g., "2" for B13 on eNB 125-1*a*, and "1" for B66/F1.2 on eNB 125-1*b*) to all devices in its coverage area. For SIB5, eNB 125-1*b* may also broadcast its inter-frequency neighbors' EN-DC-anchor-cellReselectionSubPriority from field 417 (e.g., "0.4" for B66/F1.2 on eNB 125-1*b*). In other implementations, eNB 125-1*b* may also use priorities shown in table 410 to provide IEs from fields 416 and 417 in an RRCConnectionRelease message to a specific end device 110.

Referring to FIG. 4C, table 420 includes the same signal type field 411, frequency ID field 412, cellReselectionPriority field 413, cellReselectionSubPriority field 414, effective priority field 415, EN-DC-anchor-cellReselectionPriority field 416, EN-DC-anchor-cellReselectionSubPriority field 417, and an EN-DC effective priority field 418 as described above in connection with FIG. 4B. Table 420 includes a variety of entries 429 for fields 411-418 for band B5 (corresponding to eNBs 12-2*b*).

Referring to FIGS. 4A and 4C, eNB 125-2*b* may use priorities shown in table 420 to broadcast IEs in SIB3 and SIB5. Thus, eNB 125-2*b* may broadcast cellReselectionPriority values and cellReselectionSubPriority values for SIB3 and SIB5 according to conventional LTE protocols. As an EN-DC non-anchor cell, eNB 125-2*b* may not have an (intra-frequency) EN-DC-anchor-cellReselectionPriority value in field 416 (or an EN-DC-anchor-cellReselectionSubPriority value in field 417) for SIB3. For SIB5, eNB 125-2*b* may broadcast its inter-frequency neighbors' EN-DC-anchor-cellReselectionPriority values from field 416 (e.g., "1" for B66/F1.1 on eNB 125-1*b*, "1" for B66/F1.2 on eNB 125-1*b*, and "2" for B13/F5 on eNB 125-1*a*) and EN-DC-anchor-cellReselectionSubPriority values from field 417 (e.g., "0.4" for B66/F1.2 on eNB 125-1*b*) to all devices in its coverage area. In some instances, eNB 125-2*b* may also use priorities shown in table 420 to provide IEs from fields 416 and 417 in an RRCConnectionRelease message to a specific end device 110.

The frequency bands, priorities and sub-priorities referred to in FIGS. 4A-4C are used as examples. In other implementations, different frequency bands, priorities, and/or sub-priorities may be used similarly. In another implementation, for example, cellReselectionSubPriority field 417 and/or EN-DC effective priority field 418 may be omitted.

Figure 5:
FIG. 5 is an exemplary format of a System Information Block 3 (SIB3) information element (IE) for anchor cell reselection priority, according to an implementation.

FIG. 5 illustrates an exemplary format of a SIB3 IE 500 for EN-DC anchor cell reselection priority. As shown in FIG. 5, SIB3 IE 500 may include an IE identifier "EN-DC-Anchor-cellReselectionServingFreqInfo-vXXXX," which may introduce the IE within SIB5 and a particular version (e.g., "vXXXX") of a wireless networking standard. In one implementation, SIB3 IE 500 may resemble a format for a cellReselectionServingFreqInfo IE in a conventional (non-dual connectivity) LTE environment. SIB3 IE 500 may include an "EN-DC-Anchor-cellReselectionPriority-rXX" field (where "rXX" represents a release version of a wireless network standard) and a corresponding value (e.g., 0-7). SIB3 IE 500 may also include an "EN-DC-Anchor-cellReselectionSubPriority-rXX" field (where "rXX" represents a release version of a wireless network standard) and a corresponding value (e.g., 0.1-0.9). SIB3 IE 500 may be broadcast only if the serving cell (e.g., eNB 25-1) is an LTE anchor for EN-DC.

FIG. 6 illustrates an exemplary format of a SIB5 IE 600 for EN-DC anchor cell reselection priority. As shown in FIG. 6, SIB5 IE 600 may include an IE identifier "EN-DC-Anchor-InterFreqCarrierFreqInfo-vXXXX," which may introduce the IE within SIB5 and a particular version (e.g., "vXXXX") of a wireless networking standard. In one implementation, SIB5 IE 600 may resemble a format for an InterFreqCarrierFreqInfo IE in a conventional (non-dual connectivity) LTE environment. SIB5 IE 600 may include an "EN-DC-Anchor-cellReselectionPriority-rXX" field (where "rXX" represents a release version of a wireless network standard) and a corresponding value (e.g., 0-7). SIB5 IE 600 may also include an "EN-DC-Anchor-cellReselectionSubPriority-rXX" field (where "rXX" represents a release version of a wireless network standard) and a corresponding value (e.g., 0.1-0.9). SIB5 IE 600 may be broadcast only if an Inter-frequency carrier (e.g., eNB 25-1) is an LTE anchor for EN-DC.

FIG. 7 illustrates an exemplary format of an RRCConnectionRelease IE 700 for EN-DC anchor cell reselection priority. As shown in FIG. 7, RRCConnectionRelease IE 700 may include an IE identifier "EN-DC-Anchor-FreqPriority-EUTRA-rXX," which may introduce the IE within RRCConnectionRelease and a particular release number (e.g., "rXX") of a wireless networking standard. In one implementation, RRCConnectionRelease IE 700 may resemble a format for an EN-DC-Anchor-FreqPriorityEUTRA IE in a conventional (non-dual connectivity) LTE environment. RRCConnectionRelease IE 700 may include a carrierFreq-rXX field (where "rXX" represents a release version of a wireless network standard) and a corresponding Absolute Radio Frequency Channel Number (ARFCN) value. RRCConnectionRelease IE 700 may also include an "EN-DC-Anchor-cellReselectionPriority-rXX" field (where "rXX" represents a release version of a wireless network standard) and a corresponding value (e.g., 0-7). RRCConnectionRelease IE 700 may further include an "EN-DC-Anchor-cellReselectionSubPriority-rXX" field (where "rXX" represents a release version of a wireless network standard) and a corresponding value (e.g., 0.1-0.9). RRCConnectionRelease IE 700 may be populated only for a designated LTE anchor—carrier frequency (e.g., corresponding to one of eNB 25-1*a* or eNB 125-1*b*).

Figure 8:
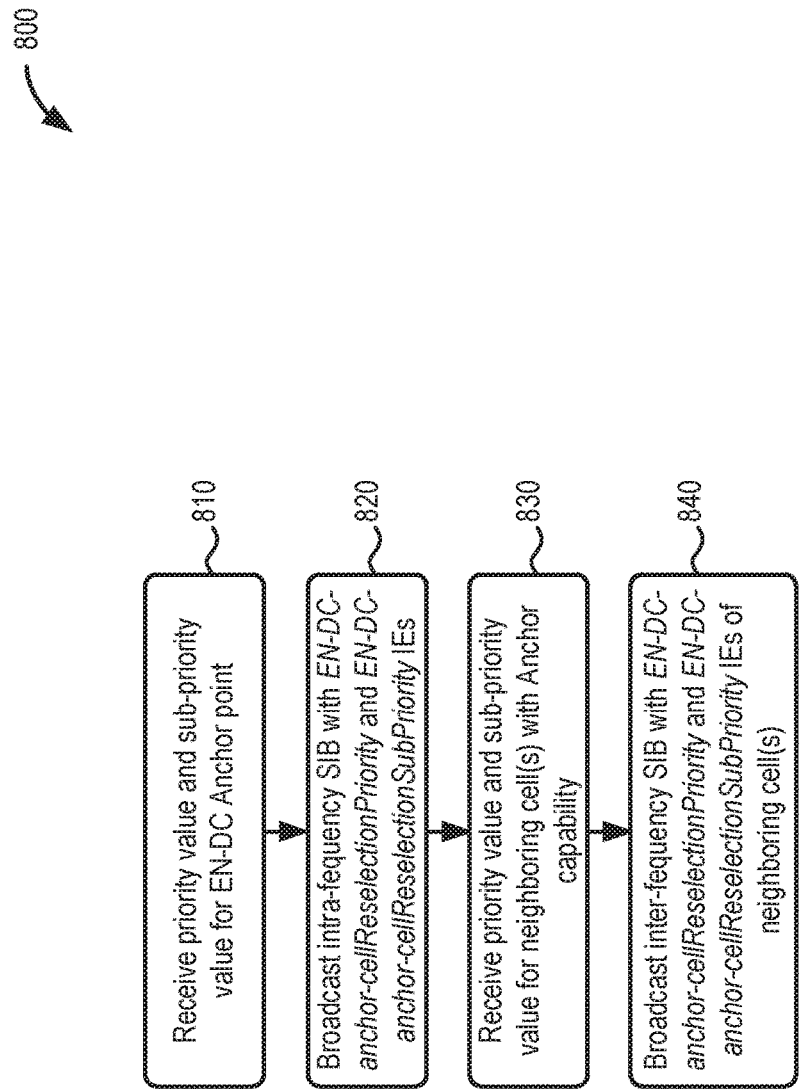
FIGS. 8 and 9 are flow diagrams illustrating exemplary processes for anchor cell reselection in a multi-RAT dual connectivity environment.

FIG. 8 is a flow diagram illustrating another exemplary process 800 for anchor cell reselection in a multi-RAT dual connectivity environment. According to an exemplary embodiment, a wireless network device (e.g., eNB 125) performs steps of process 800. For example, processor 310 executes software 320 to perform the steps illustrated in FIG. 8, and described herein. In another embodiment, eNB 125 may perform steps of process 800 in conjunction with one or more end devices, such as end device 110.

Referring to FIG. 8, in block 810, priority values and sub-priority values for an EN-DC anchor point may be received. For example, similar to conventional priority values for cellReselectionPriority and cellReselectionSubPriority, eNB 125-1 may receive, from a network device 150 in core network 140 or a network administrator device, a priority value and a sub-priority value for eNB 125-1 serving as an anchor point. eNB 125-1 may use the priority value and a sub-priority value to generate an EN-DC-anchor-cellReselectionPriority IE and an EN-DC-anchor-cellReselectionSubPriority IE.

In block 820, an intra-frequency SIB may be broadcast, the SIB including an EN-DC-anchor-cellReselectionPriority IE and an EN-DC-anchor-cellReselectionSubPriority IE. For example, eNB 125-1 may broadcast, to all devices in its coverage area, an intra-frequency SIB3 that includes the EN-DC-anchor-cellReselectionPriority IE and the EN-DC-anchor-cellReselectionSubPriority IE using the assigned Anchor point priority value and sub-priority value. The EN-DC-anchor-cellReselectionPriority IE and the EN-DC-anchor-cellReselectionSubPriority IE may supersede the conventional cellReselectionPriority IE and cellReselectionSubPriority IE values included in SIB3, when end device 110 is EN-DC-capable.

In block 830, priority values and sub-priority values for one or more neighboring cells with anchor capabilities may be received. For example, eNB 125-1 may receive priority information of neighboring cells from other eNBs 125 and/or from network devices 150 in core network 140. eNB 125-1 may use the priority information to generate an EN-DC-anchor-cellReselectionPriority IE and an EN-DC-anchor-cellReselectionSubPriority IE for an inter-frequency SIB.

In block 840, an inter-frequency SIB may be broadcast, the SIB including an EN-DC-anchor-cellReselectionPriority IE and an EN-DC-anchor-cellReselectionSubPriority IE for neighboring cells. For example, eNB 125-1 may broadcast, to all devices in its coverage area, an inter-frequency SIB5 that includes the EN-DC-anchor-cellReselectionPriority IE and the EN-DC-anchor-cellReselectionSubPriority IE. The EN-DC-anchor-cellReselectionPriority IE and the EN-DC-anchor-cellReselectionSubPriority IE supersede the conventional cellReselectionPriority IE and cellReselectionSubPriority IE values included in SIB5, when end device 110 is EN-DC-capable. The EN-DC-anchor-cellReselectionPriority IE and the EN-DC-anchor-cellReselectionSubPriority IE include priority values and sub-priority values for each neighboring eNB 125 that has EN-DC anchor capabilities.

Figure 9:
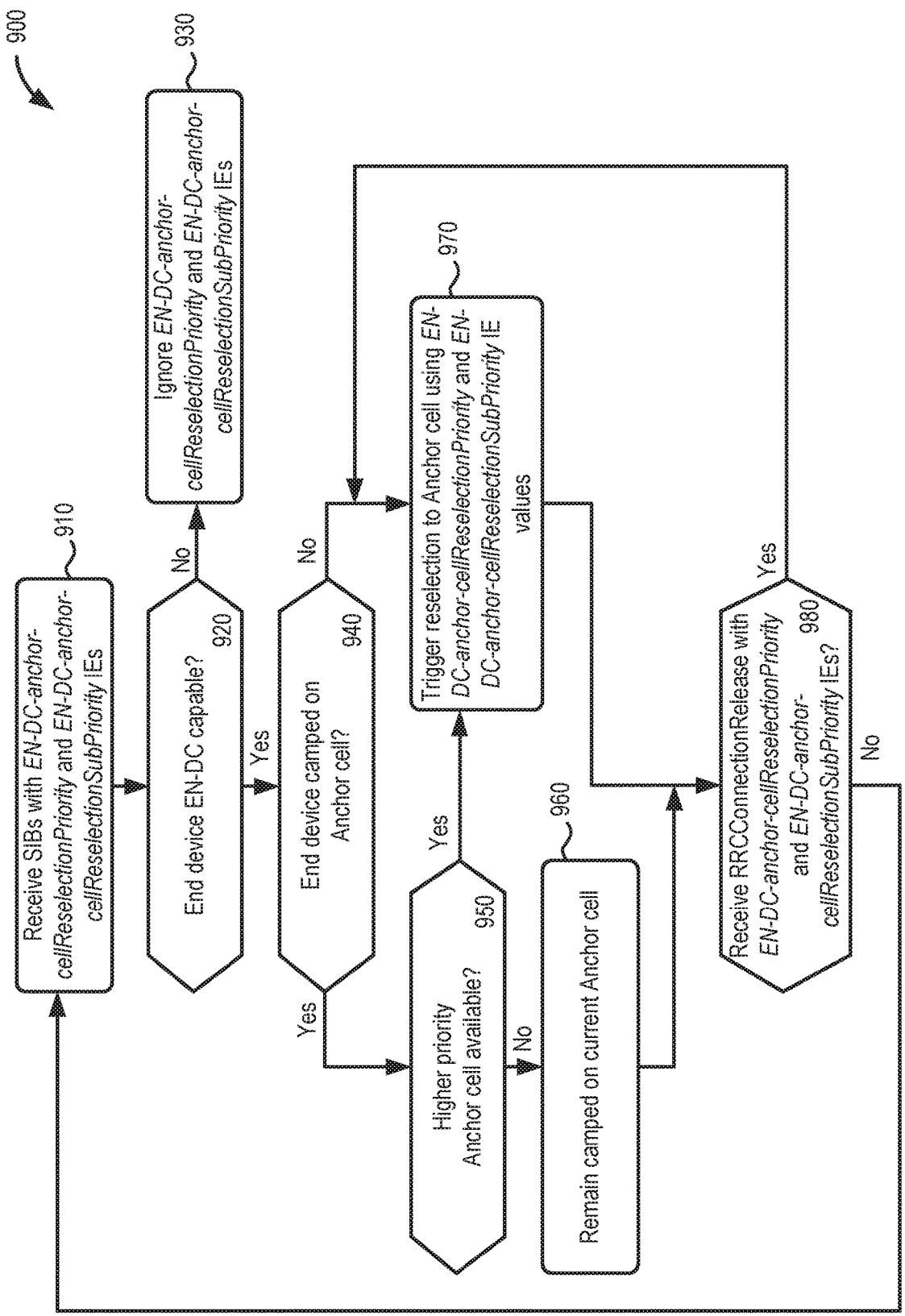

FIG. 9 is a flow diagram illustrating another exemplary process 900 for anchor cell reselection in a multi-RAT dual connectivity environment. According to an exemplary embodiment, an end device (e.g., end device 110) performs steps of process 900. For example, processor 310 executes software 320 to perform the steps illustrated in FIG. 9, and described herein. In another embodiment, end device 110 may perform steps of process 900 in conjunction with one or more network devices, such as one or more of eNBs 125.

Referring to FIG. 9, in block 910, SIBs with EN-DC-anchor-cellReselectionPriority and EN-DC-anchor-cellReselectionSubPriority IEs may be received. For example, end device 110 may receive SIB3s and/or SIB5s broadcast by eNBs 125-1 with an EN-DC-anchor-cellReselectionPriority IE. In some embodiments, the SIB3 or SIB5 may also include an EN-DC-anchor-cellReselectionSubPriority IE.

In block 920, it may be determined if the end device is EN-DC-capable. For example, end device 110 may include the capability to communicate with both E-UTRAN 120 and NG NR RAN 130. If the end device is not EN-DC capable (block 920—No), in block 930 the EN-DC-anchor-cellReselectionPriority and EN-DC-anchor-cellReselectionSubPriority IEs may be ignored. For example, if an end device is not EN-DC capable or if it is an LTE-only legacy device, the end device will skip the EN-DC-anchor-cellReselectionPriority and EN-DC-anchor-cellReselectionSubPriority IEs of SIB3 and SIB5. Instead, the end device will decode only legacy cellReselectionPriority plus cellReselectionSubPriority IEs and perform reselection as per current LTE wireless standards.

If the end device is EN-DC capable (block 920—Yes), in block 940 it may be determined if the end device is camped on an anchor cell. For example, end device 110 may determine from SIB3 or another SIB that a particular eNB 125 is an Anchor point.

If the end device is camped on an anchor cell (block 940—Yes), in block 950 it may be determined if a higher priority anchor cell is available to serve the end device. For example, end device 110 may be camped on a cell supported by eNB 125-1 with anchor capabilities. Since end device 110 is EN-DC capable, end device 110 may decode EN-DC-anchor-cellReselectionPriority and EN-DC-anchor-cellReselectionSubPriority IEs of SIB3 and SIB5.

If a higher priority anchor cell is not available to serve the end device (block 950—No), in block 960 the end device may remain camped on the current anchor cell. For example, end device 100 may determine from EN-DC-anchor-cellReselectionPriority IE of SIB5 that end device 110 is already using the highest priority anchor band frequency. Thus, end device 110 may remain camped on the current cell.

If a higher priority anchor cell is available to serve the end device (block 950—Yes) or if the end device is not camped on an anchor cell (block 940—No), in block 970 the end device may trigger reselection to an Anchor cell using EN-DC-anchor-cellReselectionPriority and EN-DC-anchor-cellReselectionSubPriority IE values. For example, end device 110 may discovers available anchor bands frequencies and their respective priorities from the EN-DC-anchor-cellReselectionPriority and EN-DC-anchor-cellReselectionSubPriority IEs in SIB3 and SIB5. End device 110 may trigger reselection to camp on the highest priority anchor band that satisfies the camping criteria for radio frequency (RF) signal conditions, such as thresholds for Reference Signal Received Power (RSRP) and Reference Signal Received Quality (RSRQ).

After remaining camped on the highest available anchor cell (block 960) or triggering reselection to an Anchor cell (block 970), in block 980 a RRCConnectionRelease with EN-DC-anchor-cellReselectionPriority and EN-DC-anchor-cellReselectionSubPriority IEs may be received. For example, end device 110 may receive RRCConnectionRelease message 230 with EN-DC-anchor-cellReselectionPriority IE 234 and, optionally, an EN-DC-anchor-cellReselectionSubPriority IE. Based on the values in EN-DC-anchor-cellReselectionPriority IE 234, end device 110 may return to block 970 to trigger reselection to camp on the highest priority anchor band (e.g., as indicated in the RRCConnectionRelease message) that satisfies the camping criteria for radio frequency (RF) signal conditions.

Although FIG. 9 illustrates an exemplary process 900 for anchor cell reselection in a multi-RAT dual connectivity environment, process 900 may include additional operations, fewer operations, and/or different operations than those illustrated in FIG. 9, and described herein. For example, in another implementation, an RRCConnectionRelease message with an EN-DC-anchor-cellReselectionSubPriority IE may also be provided to an EN-DC capable end device before the end device camps on an anchor cell.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 8 and 9, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method, comprising:
   receiving, by a wireless station, a reselection priority value of a frequency band used by the wireless station when the wireless station is an anchor for an Evolved Universal Mobile Telecommunications System (UMTS) Terrestrial Radio Access (E-UTRA)—5G New Radio (NR) Dual Connectivity (EN-DC) environment, wherein receiving the reselection priority value further includes receiving a first reselection sub-priority value for one or more frequencies within the frequency band;
   broadcasting, by the wireless station, an intra-frequency system information block (SIB) that includes a first Cell Reselection Priority information element (IE) and a first Anchor-cell Reselection Priority IE, wherein the first Anchor-cell Reselection Priority IE includes the reselection priority value of the frequency band used by the wireless station; and
   broadcasting, by the wireless station, an inter-frequency SIB that includes a second Cell Reselection Priority IE and a second Anchor-cell Reselection Priority IE, wherein the second Anchor-cell Reselection Priority IE includes another reselection priority value of another frequency band for another EN-DC anchor.

2. The method of claim 1, further comprising:
   receiving, by the wireless station, the other reselection priority value of the other frequency band used by another wireless station when the other wireless station is the other EN-DC anchor.

3. The method of claim 1, wherein the wireless station is an evolved NodeB for an Evolved Universal Mobile Telecommunications System (UMTS) Terrestrial Radio Access Network (E-UTRAN).

4. The method of claim 1, further comprising:
   sending, by the wireless station and to an end device, an RRCConnectionRelease message, wherein the RRCConnectionRelease message includes a third Anchor-cell Reselection Priority IE, wherein the third Anchor-cell Reselection Priority IE includes a different reselection priority value of another frequency band for a different EN-DC anchor.

5. The method of claim 4, wherein the RRCConnectionRelease message further includes a third Anchor-cell Reselection Sub-Priority IE that includes a third reselection sub-priority value.

6. The method of claim 1, wherein the first Anchor-cell Reselection Priority IE and the second Anchor-cell Reselection Priority IE are configured to be ignored by an end device, when the end device is not EN-DC-capable.

7. The method of claim 1, wherein the first Anchor-cell Reselection Priority IE is configured to supersede the first Cell Reselection Priority IE and the second Anchor-cell Reselection Priority IE is configured to supersede the second Cell Reselection Priority IE for an end device with EN-DC capability.

8. The method of claim 1,
wherein the intra-frequency SIB further includes a first Anchor-cell Reselection Sub-Priority IE that includes the first reselection sub-priority value.

9. The method of claim 8, wherein the inter-frequency SIB further includes a second Anchor-cell Reselection Sub-Priority IE that includes a second reselection sub-priority value.

10. The method of claim 9, wherein the first Anchor-cell Reselection Sub-Priority IE is configured to supersede the first Cell Reselection Sub-Priority IE and the second Anchor-cell Reselection Sub-Priority IE is configured to supersede the second Cell Reselection Sub-Priority IE, for an end device with EN-DC capability.

11. A wireless station, comprising:
a radio communication interface;
a communication interface to a core network;
a memory, wherein the memory stores instructions; and
a processor, wherein the processor executes the instructions to:
receive, via the communication interface to the core network, a reselection priority value of a frequency band used by the wireless station when the wireless station is an anchor for an Evolved Universal Mobile Telecommunications System (UMTS) Terrestrial Radio Access (E-UTRA)—5G New Radio (NR) Dual Connectivity (EN-DC) environment, wherein receiving the reselection priority value further includes receiving a first reselection sub-priority value for one or more frequencies within the frequency band,
broadcast, via the radio communication interface, an intra-frequency system information block (SIB) that includes a first Cell Reselection Priority information element (IE) and a first Anchor-cell Reselection Priority IE, wherein the first Anchor-cell Reselection Priority IE includes the reselection priority value of the frequency band used by the wireless station, and
broadcast, via the radio communication interface, an inter-frequency SIB that includes a second Cell Reselection Priority IE and a second Anchor-cell Reselection Priority IE, wherein the second Anchor-cell Reselection Priority IE includes another reselection priority value of another frequency band for another EN-DC anchor.

12. The wireless station of claim 11, wherein the processor further executes the instructions to:
receive the other reselection priority value of the other frequency band used by another wireless station when the other wireless station is the other EN-DC anchor.

13. The wireless station of claim 11, wherein the network device is a Long Term Evolution (LTE) evolved Node B (eNB) for a radio access network.

14. The wireless station of claim 11, wherein the processor further executes the instructions to:
send, to an end device, an RRCConnectionRelease message, wherein the RRCConnectionRelease message includes a third Anchor-cell Reselection Priority IE, wherein the third Anchor-cell Reselection Priority IE includes a different reselection priority value of another frequency band for a different EN-DC anchor.

15. The wireless station of claim 14, wherein the RRCConnectionRelease message further includes a third Anchor-cell Reselection Sub-Priority IE that includes a third reselection sub-priority value.

16. The wireless station of claim 11, wherein, when broadcasting the inter-frequency SIB, the processor further executes the instructions to:
broadcast a second Anchor-cell Reselection Sub-Priority IE that includes the first reselection sub-priority value and a second reselection sub-priority value for different frequencies of the other frequency band for the other EN-DC anchor.

17. A non-transitory, computer-readable storage medium storing instructions executable by a processor of a device, which when executed cause the device to:
receive, via a communication interface with a core network, a reselection priority value of a frequency band used by the wireless station when the wireless station is an anchor for an Evolved Universal Mobile Telecommunications System (UMTS) Terrestrial Radio Access (E-UTRA)—5G New Radio (NR) Dual Connectivity (EN-DC) environment, wherein receiving the reselection priority value further includes receiving a first reselection sub-priority value for one or more frequencies within the frequency band;
broadcast an intra-frequency system information block (SIB) that includes a first Cell Reselection Priority information element (IE) and a first Anchor-cell Reselection Priority IE, wherein the first Anchor-cell Reselection Priority IE includes the first reselection priority value of the frequency band used by the wireless station; and
broadcast an inter-frequency SIB that includes a second Cell Reselection Priority IE and a second Anchor-cell Reselection Priority IE, wherein the second Anchor-cell Reselection Priority IE includes another reselection priority value of another frequency band for another EN-DC anchor.

18. The non-transitory, computer-readable storage medium of claim 17, wherein the instructions further comprise instructions to:
send, to an end device, an RRCConnectionRelease message, wherein the RRCConnectionRelease message includes a third Anchor-cell Reselection Priority IE, wherein the third Anchor-cell Reselection Priority IE includes a different reselection priority value of another frequency band for a different EN-DC anchor.

19. The non-transitory, computer-readable storage medium of claim 17, wherein the instructions to broadcast the inter-frequency SIB further comprise instructions to:
broadcast a second Anchor-cell Reselection Sub-Priority IE that includes the first reselection sub-priority value and a second reselection sub-priority value for different frequencies of the other frequency band for the other EN-DC anchor.

20. The non-transitory, computer-readable storage medium of claim 17, wherein the intra-frequency SIB further includes a first Anchor-cell Reselection Sub-Priority IE that includes the first reselection sub-priority value.

\* \* \* \* \*